Figure 3:
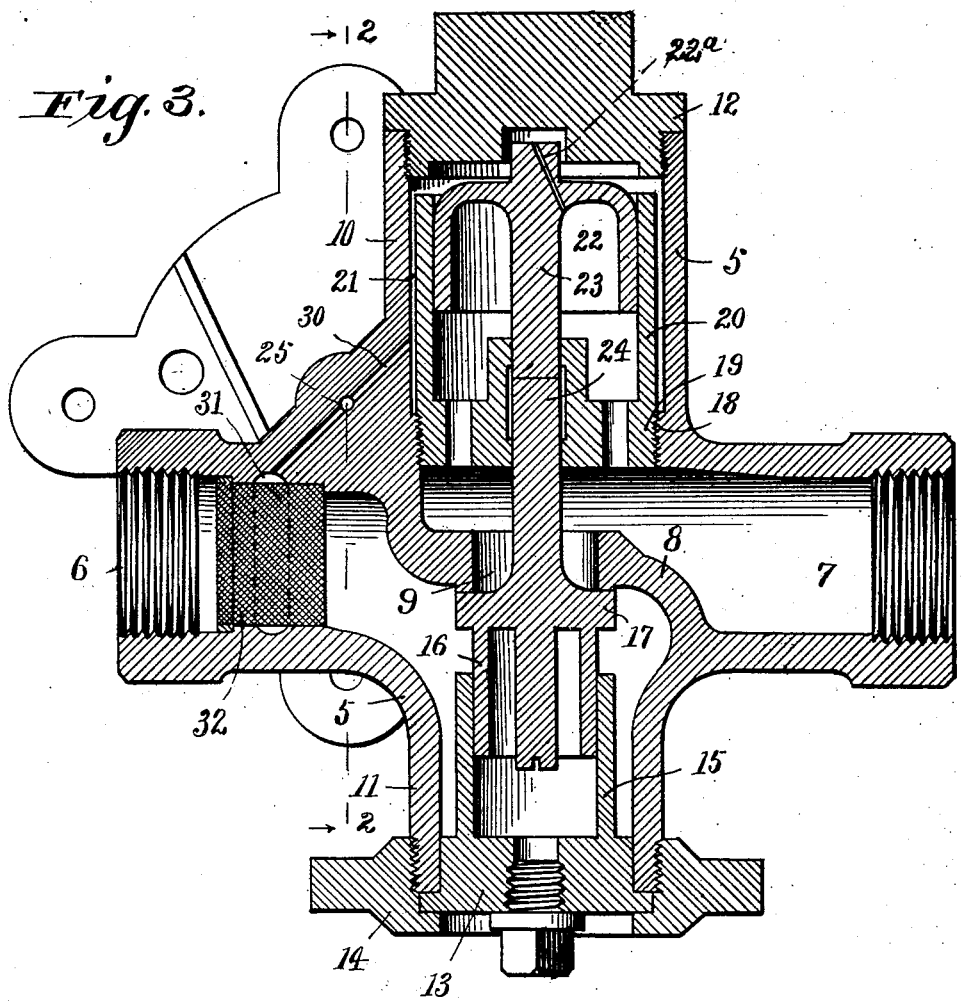

G. W. COLLIN.
ELECTRICALLY OPERATED VALVE.
APPLICATION FILED JULY 17, 1909.
1,033,542.
Patented July 23, 1912.
2 SHEETS—SHEET 1.
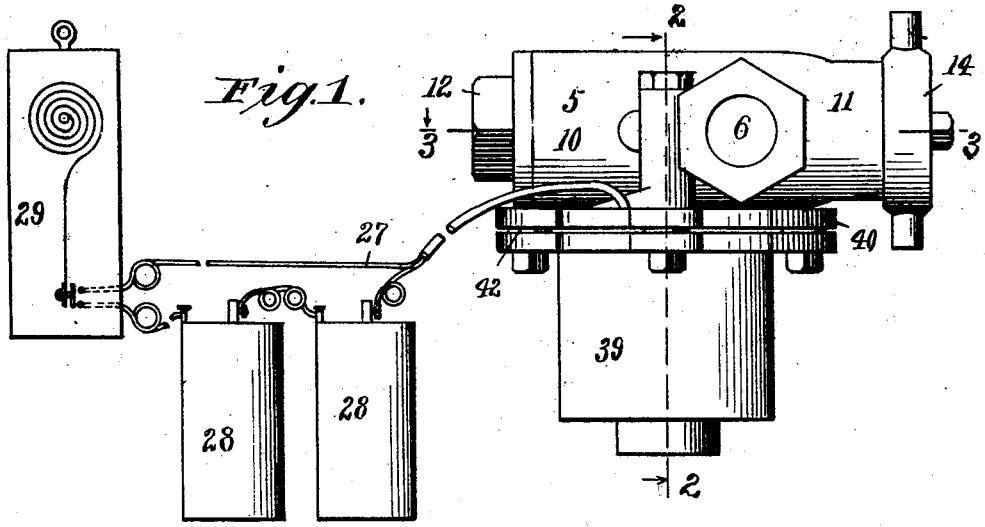
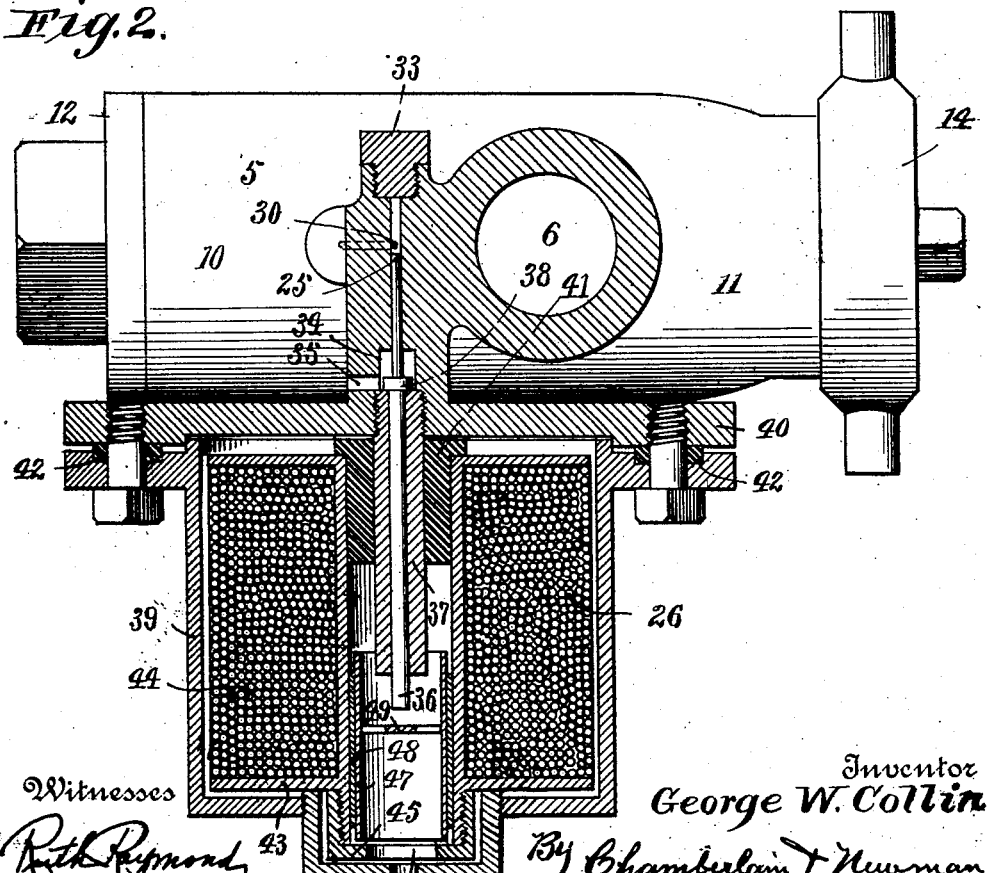
Witnesses
Ruth Raymond
Ernst P. Nold
Inventor
George W. Collin
By Chamberlain & Newman
Attorneys

G. W. COLLIN.
ELECTRICALLY OPERATED VALVE.
APPLICATION FILED JULY 17, 1909.

1,033,542.

Patented July 23, 1912.
2 SHEETS—SHEET 2.

Witnesses
Ruth Raymond
Ernst P. Wold

Inventor
George W. Collin
By Chamberlain & Newman
Attorneys

UNITED STATES PATENT OFFICE.

GEORGE W. COLLIN, OF BRIDGEPORT, CONNECTICUT, ASSIGNOR TO THE COLLIN VALVE COMPANY, OF PORTLAND, MAINE, A CORPORATION OF MAINE.

ELECTRICALLY-OPERATED VALVE.

1,033,542.

Specification of Letters Patent. Patented July 23, 1912.

Application filed July 17, 1909. Serial No. 508,102.

*To all whom it may concern:*

Be it known that I, GEORGE W. COLLIN, a citizen of the United States, and resident of Bridgeport, in the county of Fairfield and State of Connecticut, have invented certain new and useful Improvements in Electrically-Operated Valves, of which the following is a specification.

My invention relates to valves and particularly to electrically controlled steam admission valves for passenger car steam heating, buildings or any service where temperature regulation is regulated by the admission of steam to radiating system of piping.

It is the purpose of the invention to improve upon the construction of valves of the above class whereby a more uniform degree of temperature can be automatically maintained within a car or other compartment when heated by steam from the boiler; to design the valve so that it can be operated by the action of a thermostat and through the medium of a solenoid connected to the said valve and actuated by a battery; to produce a valve the action of which will be positive and responsive to the least change in temperature; and further to so design the valve that it can be made comparatively inexpensive.

With the above objects in view my invention resides and consists in the novel construction and combination of parts shown upon the accompanying two sheets of drawings forming a part of this specification, upon which similar characters of reference denote like or corresponding parts throughout the several figures and of which, Figure 1, shows a side view of my improved valve complete, arranged beneath a car floor and connected up with batteries and thermostat as in use. Fig. 2, is a cross section through the valve and its solenoid, taken on line 2—2 of Figs. 1 and 3, and Fig. 3, is a further cross section through the valve body, taken on line 3—3 of Fig. 1.

This particular type of valve in practice would be arranged between the main train piping and the car branch or service pipe, one being provided for each car. The valve is normally open allowing a free flow of steam to the piping of the car when the steam connections are made. Its construction is such as to provide for expansion and contraction in a way which will not cause the operative parts to bind, but will permit all movable members to work freely and positive.

5 represents the body of the valve, and to which the solenoid, solenoid case and other associate parts are connected. The body contains an inlet 6 and outlet 7 adapted to be connected up with a steam pipe and by means of which the steam is passed through the valve. The inlet and outlet sides of the valve body are divided by a division wall 8 provided with a valve port 9 having a seat upon its underside. The body further contains two right angle cylindrical extensions 10 and 11 both of which are formed in line with the port 9, one being inclosed by a suitable screw cap 12 and the other with a flanged cap 13 secured in place by a nut 14. This cap 13 is provided with an inwardly disposed annular cylinder to form a guide 15 for the guide piston 16 of the main valve 17. The lower end of the larger chamber 10 is threaded as at 18 to receive the lower threaded end 19 of a cylinder 20. The side walls of the cylinder are of a uniform thickness upon all sides and are spaced from the walls of the chamber as shown at 21 so as to permit the steam within the chamber to freely circulate all around the cylinder and heat and expand the same equally on all sides. The inner surface of this cylinder is smoothly finished to receive a piston 22 that is reciprocatingly mounted in the upper part of the cylinder in a way to be operated by the steam pressure and for the purpose of opening the main valve. The piston is provided with a depending stem 23 which is guided in a central hole of the bottom of the cylinder and there contacts with the end of the main valve stem 24. This cylinder as well as the guide 15 is supported at the end distant from its part engaged by the piston, with the result that any unequal expansion of that portion where the metal is of unequal thickness and may be affected in its expansion by its contact with the body casting will not affect the contour of the section in which the piston acts, thus insuring a uniform operation at all times.

As before stated the valve is opened and closed automatically by the initial steam pressure acting on the piston which is of a greater area than the main valve. The steam pressure upon the piston is controlled through the medium of an auxiliary or pilot valve 25 that in turn is actuated by a solenoid 26 which is connected by wires 27 with batteries 28 and a thermostat 29. The thermostat is obviously for the purpose of making and breaking the electric contact thus alternately energizing and deënergizing the solenoid that operates the auxiliary valve. This thermostat would obviously suitably be located within the compartment, so as to be exposed to the temperature thereof, while the batteries could be located in any suitable place. The auxiliary valve is arranged intermediate of a passage 30 leading from the inlet to above the piston and serves to cut off the steam pressure from above the piston whereupon such pressure escapes to the service side of the valve through the drilled passage 22ª allowing the main valve to close by the initial pressure. The intake of the passage 30 is from an annular recess 31 in the inlet and covered by a suitable strainer 32. The auxiliary valve comprises a stem operatively mounted within a bore and arranged at a right angle to the passage 30. The outer end of the bore is closed by a plug 33 while the inner end is enlarged as at 34 and provided with an outlet 35 whereby any escaping steam or condensation from the auxiliary valve will be permitted to escape. The rod 36 is reciprocatingly mounted within a tube 37 attached to the body, in line with the auxiliary valve stem and is provided with a head 38 to prevent it from dropping down.

The solenoid is of a special construction and inclosed by a suitable case 39 that is secured to a flange 40 of the main body 5 by screws, and bushed therefrom by fiber washers 42 to insulate the solenoid from the heat of the valve. A bushing 41 is fitted upon the tube 37 and projects within the solenoid. The spool 43 of the solenoid is provided with an extension that is threaded and covered by a cap 45 having a central hole 46 therein that registers with the one in the case 39 to form an opening. The hole through the spool is of a cylindrical form and in it is mounted a cylindrical shaped armature 47 that is provided with a brass liner 48 and a cross lift bar 49 that serves to engage the end of the slide rod 36 which in turn operates the auxiliary valve. Both the rod 36 and auxiliary valve normally rest in a lowered or open position as seen in Fig. 2, and are operated to close the said valve by the action of the armature being drawn up and striking the rod as will be obvious. When the armature is dropped by the solenoid the steam pressure promptly acts on the auxiliary valve to force it down.

When the steam is turned on the valve the passage 30 is open, by reason of the auxiliary valve stem being in its lower position, permitting the steam to pass to the chamber above the piston, forcing it down, thus opening the main valve. A full head of steam is thereby passed through the main valve to the car radiators until the temperature in the car is brought up to the required degree, whereupon the thermostat which has been previously set, contacts, sending a current from the batteries into the solenoid causing the same to become charged and lifting its movable member 47, the rod 36 and auxiliary valve, closing the same and the passage 30 to chamber above the piston, cutting off the entrance of steam to the piston chamber, the pressure therein falls, permitting the initial pressure to close the main valve, cutting off the supply of steam to the heaters until such time as the temperature falls, whereupon the thermostat breaks the contact and the valve is opened.

From the foregoing it will be seen that a very desirable form of admission valve is produced in that it is without springs or other objectionable parts and is so constructed as to permit the water of condensation to freely flow back to the train pipe or supply pipe when steam is cut off.

Having thus described my invention what I claim and desire to secure by Letters Patent is:—

1. The combination with a valve comprising a valve body and, within it, a main valve and fluid-pressure-operated actuating means therefor, and a pilot valve controlling the operation of said fluid-pressure-operated means, of electrical means for operating said pilot valve comprising a tube connected to said valve body, a valve stem for said pilot valve mounted to slide within said tube, a solenoid surrounding said tube, and a hollow cylindrical slidable armature mounted within the bore of said solenoid and provided with means for actuating the stem of said pilot valve.

2. The combination with a main valve comprising a valve body and, within it, a main valve and fluid-pressure-operated actuating means therefor, and a pilot valve controlling such fluid-pressure-operated means, of a solenoid for operating said pilot valve comprising a tube, screw-connected to said valve body, said pilot valve comprising a stem mounted to slide in said tube, a bushing mounted upon the tube, and a spool mounted upon the bushing and having a central cylindrical bore, a hollow plunger mounted within the bore, and having means to engage the said valve stem, and a cap on the end of the solenoid.

3. The combination with a valve comprising a valve body and, within it, a main valve and fluid-pressure-operated actuating means therefor, and a pilot valve controlling the operation of said fluid-pressure-operated means, of electrical means for operating said pilot valve, comprising a tube connected to said valve body, a valve stem for said pilot valve mounted to slide within said tube, a solenoid surrounding said tube, an apertured bushing between said tube and the bore of said solenoid, and a hollow cylindrical slidable armature mounted within the bore of said solenoid and provided with means for actuating the stem of said pilot valve.

4. The combination with a valve comprising a valve body and, within it, a main valve and fluid-pressure-operated actuating means therefor, and a pilot valve controlling the operation of said fluid-pressure-operated means, of electrical means for operating said pilot valve comprising a tube connected to said valve body, a valve stem for said pilot valve mounted to slide within said tube, a solenoid surrounding said tube, and a hollow cylindrical slidable armature mounted within the bore of said solenoid and provided with means for actuating the stem of said pilot valve, and a casing detachably connected to the valve body and inclosing the solenoid.

5. The combination with a main valve comprising fluid-pressure-operated actuating means and an auxiliary valve controlling said fluid-pressure-operating means, of a tube directly connected to the body of the main valve and in line with the auxiliary valve, said auxiliary valve having a stem mounted within said tube, a solenoid surrounding but spaced away from said tube, an armature slidably mounted within the solenoid and constructed to engage the stem of the auxiliary valve, and a casing detachably connected to the body of the main valve and inclosing the solenoid.

6. The combination with a main valve comprising fluid-pressure-operated actuating means and an auxiliary valve controlling said fluid-pressure-operating means, of a tube directly connected to the body of the main valve and in line with the auxiliary valve, said auxiliary valve having a stem mounted within said tube, a solenoid surrounding but spaced away from said tube, an armature slidably mounted within the solenoid and constructed to engage the stem of the auxiliary valve, a casing detachably connected to the body of the main valve and inclosing the solenoid, and a bushing between said tube and solenoid.

7. The combination with a main valve comprising fluid-pressure-operated actuating means and an auxiliary valve controlling said fluid-pressure-operating means, of a tube directly connected to the body of the main valve and in line with the auxiliary valve, said auxiliary valve having a stem mounted within said tube, a solenoid surrounding but spaced away from said tube, an armature slidably mounted within the solenoid and provided with a liner constructed to engage said stem, and a casing detachably connected to the body of the main valve and inclosing the solenoid.

Signed at Bridgeport, in the county of Fairfield, and State of Connecticut this 9th day of July, A. D., 1909.

GEORGE W. COLLIN.

Witnesses:
C. M. NEWMAN,
RUTH RAYMOND.